United States Patent
Schlesiger et al.

(10) Patent No.: US 7,012,139 B2
(45) Date of Patent: Mar. 14, 2006

(54) PROCESS OF PREPARING DELAYED-DISSOLUTION CELLULOSE ETHERS

(75) Inventors: Hartwig Schlesiger, Fallingbostel (DE); Wolfgang Dannhorn, Soltau (DE); Jörn-Bernd Pannek, Fallingbostel (DE); Volkhardt Müller, Walsrode (DE); Frank Höhl, Neuenkirchen (DE)

(73) Assignee: Wolff Cellulosics GmbH & Co. KF, Walsrode (DE)

( * ) Notice: Subject to any disclaimer, the term of this patent is extended or adjusted under 35 U.S.C. 154(b) by 0 days.

(21) Appl. No.: 10/303,282

(22) Filed: Nov. 25, 2002

(65) Prior Publication Data

US 2003/0130500 A1 Jul. 10, 2003

(30) Foreign Application Priority Data

Nov. 28, 2001 (DE) ................................ 101 58 488

(51) Int. Cl.
*A61K 31/717* (2006.01)
*C08B 11/20* (2006.01)

(52) U.S. Cl. ............................ 536/85; 536/56; 536/57; 536/124; 536/84; 514/338; 510/446; 424/451

(58) Field of Classification Search ................. 536/56, 536/124, 85, 57, 84; 514/57, 338; 106/203.1; 510/446; 424/451
See application file for complete search history.

(56) References Cited

U.S. PATENT DOCUMENTS

| 2,466,631 A | 11/1949 | Kunz ........................ 260/231 |
| 2,647,064 A | 7/1953 | Anderson et al. ........... 106/179 |
| 2,684,914 A | 7/1954 | Heiss ......................... 106/197 |
| 2,720,464 A | 10/1955 | Anderson et al. ........... 106/197 |
| 2,879,268 A | 3/1959 | Jullander .................... 260/232 |
| 3,072,635 A | 1/1963 | Menkart et al. ............ 260/232 |
| 3,489,719 A * | 1/1970 | Savage et al. ............... 525/385 |
| 4,537,958 A * | 8/1985 | Strange et al. ................ 536/85 |
| 5,898,072 A * | 4/1999 | Bostrom et al. .............. 536/84 |

FOREIGN PATENT DOCUMENTS

| EP | 597 364 | 11/1993 |
| GB | 1080249 | 8/1967 |
| GB | 1 161 953 | 8/1969 |
| WO | 95/30705 | 11/1995 |
| WO | 99/18132 | 4/1999 |

OTHER PUBLICATIONS

Ullmann's Encyclopedia of Industrial Chemistry, vol. A5, (month unavailable) 1986, pp. 472-473 "Cellulose Ethers". Patent Abstracts of Japan vol. 006, No. 266 (C-142), (Dec. 25, 1982) & JP 57 158244 A (KAO Sekken KK), (Sep. 30, 1982) "Zusammenfassung" & Database Chemabs 'Online! Chemical Abstracts Service, Columbo, Ohio, US; retrieved from STN Database accession No. 98:109165 "Zusammenfassung" & Database WPI Week 198245 Derwent Publications Ltd., London, GB; AN 1982-95856e & JP 57 158244 A (KAO Soap Co Ltd), (Sep. 30, 1982) "Zusammenfassung".

* cited by examiner

Primary Examiner—James O. Wilson
Assistant Examiner—Devesh Khare
(74) Attorney, Agent, or Firm—Joseph C. Gil; James R. Franks

(57) ABSTRACT

A process for preparing cellulose ethers having delayed dissolution in water is described. The process comprises: (a) treating a moist cellulose ether with a solution comprising a dialdehyde; (b) adding an aqueous salt solution to the moist cellulose ether, such that said cellulose ether has a pH of from 6.0 to 8.0, the aqueous salt addition being performed at least one of, (i) prior to step (a), (ii) concurrently with step (a), and (iii) subsequent to step (a); and (c) drying and comminuting the treated cellulose ether of step (b). The cellulose ether, or mixtures of cellulose ethers, prepared by the method of the present invention may be used as protective colloids, thickeners and adhesives.

12 Claims, No Drawings

PROCESS OF PREPARING DELAYED-DISSOLUTION CELLULOSE ETHERS

CROSS REFERENCE TO RELATED PATENT APPLICATION

The present patent application claims the right of priority under 35 U.S.C. §119 (a)–(d) of German Patent Application No. 101 58 488.1, filed Nov. 28, 2001.

FIELD OF THE INVENTION

The invention relates to delayed-dissolution cellulose ethers and a process for preparing delayed-dissolution cellulose derivatives by reversible crosslinking with dialdehydes, preferably glyoxal.

BACKGROUND OF THE INVENTION

Water-soluble cellulose ethers, e.g. methylcellulose, methylhydroxyethylcellulose, methylhydroxypropylcellulose, hydroxyethylcellulose, carboxymethylcellulose, have found widespread use as adhesives, thickeners or protective colloids. However, introduction of the cellulose ether which is normally in dry powder form into water or aqueous systems is frequently associated with problems, since these substances tend to gel on the surface when added to water, and form lumps. This results in undesirably long dissolution times.

It has been known for a long time that the dissolution behaviour of cellulose ethers can be influenced by means of an after- or post-treatment.

U.S. Pat. No. 2,684,914, for example, describes a method of increasing the viscosity of carboxymethylcellulose (CMC) by use of formaldehyde and sodium hydroxide. The aim of this method is to permanently alter the viscosity of CMC compared with the untreated CMC.

Various methods of influencing the dissolution behaviour by use of surface-active substances are also known, such as described in U.S. Pat. No. 2,647,064 or U.S. Pat. No. 2,720,464.

U.S. Pat. No. 2,879,268 describes a process for treating cellulose derivatives in solid form with formaldehyde or glyoxal at a low pH in order to minimize the tendency of the cellulose derivatives to agglomerate during dissolution.

DE-A-1 051 836 describes a process for treating water-soluble cellulose ethers which is characterized in that the cellulose ether, in finely divided powder form, is treated with polyfunctional compounds.

U.S. Pat. No. 3,072,635 describes a process for preparing water-dispersible cellulose derivatives by treatment of such cellulose derivatives with glyoxal.

DE-A-1 239 672 describes a process for preparing pulverulent methylcellulose which is soluble in water without lump formation, in which the methylcellulose is kneaded with a dialdehyde and water at a pH of from 3 to 7 and is subsequently dried and comminuted.

U.S. Pat. No. 3,489,719 describes a process for the surface treatment of dry water-soluble cellulose derivatives using a dialdehyde, a fatty acid ether and an acid catalyst.

WO 99/18132 describes a process for preparing polysaccharide derivatives which display delayed dissolution in water by means of glyoxal, which is characterized in that part of the energy required is introduced in the form of electromagnetic radiation.

Ullmann's Encyclopedia of Industrial Chemistry, Volume A5, 1986, pp. 472–473, describes methods of delaying the dissolution of methylcellulose and mixed methylcellulose ethers. Aqueous glyoxal having a pH of from 4 to 5 is used to delay dissolution.

The majority of these methods employ acid catalysts and often require multistage drying or additional treatment steps after drying and comminution. They frequently lead to an undesirable decrease in viscosity with increasing storage time. In addition, they are typically inapplicable to both ionic and nonionic cellulose ethers, so that various mixtures of chemicals have to be kept available to delay the dissolution of ionic and nonionic cellulose ethers.

There is therefore still a need to alleviate all these disadvantages.

SUMMARY OF THE INVENTION

It is therefore an object of the present invention to provide a delaying system which: can be employed for both ionic and nonionic cellulose ethers; includes no additional treatment steps; uses no acid catalysts; gives a minimum decrease in viscosity; and makes do with standard grades or technical grades of the reagents used.

In accordance with the present invention, there is provided a process for preparing cellulose ethers having delayed dissolution in water, comprising:
  (a) treating a moist cellulose ether with a solution comprising a dialdehyde;
  (b) adding an aqueous salt solution (comprising at least one salt of an organic and/or inorganic acid, preferably a salt of an inorganic acid) to the moist cellulose ether, such that said cellulose ether has a homogenous pH of 6.0 to 8.0, the aqueous salt addition being performed at least one of, (i) prior to step (a), (ii) concurrently with step (a), and (iii) subsequent to step (a); and
  (c) drying and optionally comminuting the treated cellulose ether of step (b).

As used herein and in the claims, the concurrent addition of the aqueous salt solution and treatment of the moist cellulose ether with a dialdehyde, in step (b)(ii), is meant to be inclusive of treating (or adding to) the moist cellulose ether with a mixture comprising the dialdehyde solution and the aqueous salt solution.

A preferred procedure, in accordance with the present invention, is to make available both an aqueous solution of the dialdehyde and an aqueous salt solution which is able to set (or adjust) the pH of the cellulose ether to 6.0 to 8.0 and to add each of these two solutions to the moist cellulose ether in the amounts required to achieve the desired delay in dissolution. However, it is likewise possible to mix the two aqueous solutions before addition to the moist cellulose ether.

Unless otherwise indicated, all numbers expressing quantities of ingredients, reaction conditions, etc. used in the specification and claims are to be under stood as modified in all instances by the term "about."

DETAILED DESCRIPTION OF THE INVENTION

As used herein and in the claims, a moist cellulose ether is a cellulose ether which is moist with solvent, preferably moist with water.

The solution of the dialdehyde is preferably an aqueous solution.

The delay in dissolution achieved by means of dialdehydes is believed, based on information at hand, to be the result of the formation of hemiacetals which occurs by an acid-catalysed mechanism. Nevertheless, setting of the pH of the cellulose ether to 6.0 to 8.0 in the process of the invention surprisingly gives the same results in respect of a delay in dissolution as does the use of an acid catalyst.

As used herein and in the claims, the pH of the cellulose ether is the pH of a 2% strength by weight solution of the pulverulent cellulose ether product in deionized water.

The water-soluble cellulose ether used in this procedure can be a nonionic cellulose ether, for example one from the group consisting of methylcellulose, methylhydroxyethylcellulose, methylhydroxypropylcellulose and hydroxyethylcellulose, or an ionic cellulose ether, for example one from the group consisting of carboxymethylcellulose, carboxymethylhydroxyethylcellulose, sulphoethylcellulose and carboxymethylsulphoethylcellulose. It is likewise possible to use mixtures of the cellulose ethers mentioned.

After addition of the two aqueous solutions or the mixture of the two aqueous solutions but before drying and comminution, the cellulose ether should have a water content of from 40 to 80% by weight, based on the total weight of the composition. The water content can be set (or adjusted) by the addition of the aqueous solutions or, if necessary, by addition of further water.

If desired, further solvents such as alcohols (e.g., methanol, ethanol, isopropanol and tert-butanol) which adhere to the cellulose ether after it has been washed, may be present.

The drying and comminution of the cellulose ether which is moist with water, in step (c), can also be carried out as combined milling/drying, in which case drying takes place with simultaneous comminution.

The addition of the two aqueous solutions or the mixture of the two aqueous solutions to the cellulose ether can be carried out batchwise or continuously, depending on the design of the production plant. Addition is typically carried out by spraying or dropwise addition, or by means of other suitable art recognised methods of addition while mixing the moist cellulose ether.

In contrast to the procedure described according to the invention, addition of the salts in solid form does not lead to a homogeneous setting of the pH and does not overcome the disadvantages described.

The dialdehyde used for delaying dissolution is preferably glyoxal. The glyoxal solution is added in such an amount that from 0.1 to 4% by weight of the active substance (i.e., glyoxal), based on the dry cellulose ether, is present. Preference is given to using from 0.3 to 2.5% by weight of the active substance, based on the dry cellulose ether weight.

As glyoxal solution, it is possible to use technical (or commercial) grades which, for example, contain proportions of acid without the quality of the product being reduced.

To set (or adjust) the pH of the cellulose ether to 6.0 to 8.0, an aqueous salt solution comprising at least two salts is preferably used. The pH of the cellulose ether is preferably set to from 6.5 to 7.5.

One of the salts is a weak acid having a $pK_a$ of from 5.5 to 8.5, preferably from 6.5 to 7.5, and the other salt is the salt of weak acid having a $pK_a$ of from 5.5 to 8.5, preferably from 6.5 to 7.5. As aqueous salt solution, particular preference is given to a solution of an alkali metal dihydrogen phosphate, e.g., sodium dihydrogen phosphate, and a di(alkali metal) hydrogen phosphate, e.g., disodium hydrogen phosphate or sodium potassium hydrogen phosphate. The two salts are preferably used in a molar ratio of from 2:1 to 1:2, particularly preferably in a molar ratio of from 1.2:1 to 1:1.2. The same conditions can also be obtained by, for example, partial neutralization of a weak acid or partial acidification of the salt of a weak acid.

In each case, the aqueous salt solution should be prepared before addition to the cellulose ether. Both addition before or after the addition of the aqueous glyoxal and simultaneous addition with the aqueous glyoxal and also addition of the mixture of the salt solution with the glyoxal solution are the subject-matter of the invention. Preference is given to preparing a mixture of the salt solution with the glyoxal solution and adding it to the cellulose ether which is moist with water. Only these methods of addition lead to the desired advantageous effects; addition of the dry salts to the moist product or separate addition of the weak acid and the salt of a weak acid do not lead to the desired advantageous effects. For example, if an alkaline cellulose ether is after-treated with an acid in a manner contrary to the teachings of the present invention, homogeneous neutralization is not achieved. Although a solution of the cellulose ether then has a neutral pH in water, acidic and basic regions can be found in the powder, e.g. by spraying the powder with an indicator solution.

The aqueous salt solution is used in such an amount that the salts on a dry basis are present in an amount of from 0.01 to 2% by weight, preferably from 0.1 to 1% by weight, particularly preferably from 0.2 to 0.5% by weight, based on the dry cellulose ether weight.

By means of this procedure, it was possible to prepare cellulose ethers which displayed delayed dissolution in water and underwent a decrease in viscosity of less than 15%, based on the initial viscosity, after a storage time of 2 years.

On dissolution in water, a cellulose ether according to the invention will influence the pH of water so that it is increased in the case of an acidic solution and is decreased in the case of a basic solution. This buffering effect is set in the procedure according to the invention in such a way that it is still possible to trigger or accelerate the dissolution process by means of a deliberate increase in the pH by addition of basic substances.

As used herein, the "delay time" is the time which elapses between the stirring of the cellulose ether into water and the commencement of the dissolution process.

In accordance with the present invention, there is also provided a method comprising: (i) providing a cellulose ether prepared by the method of the present invention, as described previously herein, e.g., in the Summary of the Invention; and (ii) preparing one of a protective colloid, a thickener and an adhesive, from the cellulose ether. It is also possible to prepare mixtures of the cellulose ethers which display delayed dissolution in water and to use them in the applications described (e.g., as protective colloids, thickeners and adhesives).

EXAMPLES

Examples 1 to 3

Variation of the MHEC/CMC Mixing Ratio.

An MHEC (DS about 1.8 and MS about 0.45) which was moist with water and a CMC (DS about 0.9) which was moist with water were in each case placed in a batch mixer and sprayed with an aqueous solution containing glyoxal and $Na_2HPO_4+NaH_2PO_4$ in a molar ration of 1:1 while mixing. The amount of water was in each case set so that the water content at the end of the addition of the aqueous solution was 50% by weight, based on the total mass. The amount of salts used was 0.3% by weight based on the sum of the dry cellulose ethers and the amount of glyoxal used was 2.2% by weight based on the sum of the dry cellulose ethers. The moist cellulose ethers were dried at 55° C. in a drying oven and subsequently milled. The products obtained could be stirred into water or into alkaline solutions without formation of lumps. Solutions of high solution quality without an increase in the turbidity or an increase in the gel content relative to the starting materials were obtained.

| Example | MHEC kg (dry) | CMC, kg (dry) | pH | Delay time in alkaline solution, pH 9 |
| --- | --- | --- | --- | --- |
| 1 | 0.25 | 2.25 | 6.5 | 3 min |
| 2 | 0.5 | 2.0 | 6.5 | 3 min |
| 3 | 0.75 | 1.75 | 6.4 | 3 min |

Examples 4 to 7

Variation of the Composition of the Buffer/Glyoxal.

A CMC (DS about 0.9) which was moist with water was placed in a batch mixer in an amount corresponding to 2.5 kg of dry CMC and sprayed with an aqueous solution containing glyoxal and $Na_2HPO_4$ and $NaH_2PO_4$ while mixing. The amount of water was in each case set so that the water content at the end of the addition of the aqueous solution was 50% by weight, based on the total mass. If necessary, additional water was metered in to achieve the desired water content. The moist CMC was dried at 55° C. in a drying oven and subsequently milled. The amount of salts used based on the sum of the dried CMC and the amount of glyoxal used based on the dry CMC are indicated in the table below. The products obtained could be stirred into water or into alkaline solutions without formation of lumps. Solutions of high solution quality without an increase in the turbidity or an increase in the gel content relative to the starting materials were obtained.

| Example | Molar ratio of $Na_2HPO_4/NaH_2PO_4$ | Amount of $Na_2HPO_4/NaH_2PO_4$ used, % by weight based on dry CMC | Glyoxal, % by weight based on dry CMC | pH | Delay time in alkaline solution, pH 9 |
| --- | --- | --- | --- | --- | --- |
| 4 | 1 to 1 | 0.3 | 0.26 | 7 | 0.5 min |
| 5 | 1 to 1 | 0.3 | 1.02 | 6.6 | 2.5 min |
| 6 | 1 to 1 | 0.5 | 2.24 | 6.6 | 3 min |
| 7 | 2 to 1 | 0.5 | 2.24 | 6.6 | 3 min |

Example 8

Comparative Example Without Buffer.

As in Example 6, a CMC (DS about 0.9) was sprayed with aqueous glyoxal solution (technical grade) in a batch mixer. However, for comparison, no salt solution was used to set the pH. The CMC was dried and milled as in Example 6. The product obtained could be stirred into water or into alkaline solutions without formation of lumps. The delay time at pH 9 was 3 minutes. The pH of the resulting solution was 5.2. Solutions with a marked increase in the turbidity and a marked increase in the gel content relative to the starting materials were obtained.

Examples 9 to 12

Starting CMC with Varying pH and Viscosity.

CMCs (DS about 0.9) having different viscosities and pH values in deionized water of from 7.3 to 8.8 were subjected to a dissolution-delaying treatment as described above (Example 5) using an aqueous solution containing glyoxal and $Na_2HPO_4+NaH_2PO_4$ in a molar ratio of 1:1. The amount of water was in each case set so that the water content at the end of the addition of the aqueous solution was 50% by weight based on the total mass. The amount of salt used was 0.3% by weight based on the dry cellulose ether and the amount of glyoxal used was 1.02% by weight based on the dry cellulose ether.

The products obtained could be stirred into water or into alkaline solutions without formation of lumps. Solutions of high solution quality without an increase in the turbidity or an increase in the gel content relative to the starting materials were obtained. The following table describes the results:

| Example | pH of starting substance | pH of product | Delay time in deionized water | Viscosity at a concentration of 2% |
| --- | --- | --- | --- | --- |
| 9 | 8.8 | 7.3 | 8 min | 42 500 |
| 10 | 8.3 | 6.6 | 8.5 min | 9 900 |
| 11 | 7.9 | 6.6 | 6.5 min | 8 100 |
| 12 | 7.3 | 6.6 | 9 min | 18 900 |

Example 13

1 000 kg of a CMC (DS about 0.9, moisture content about 10% by weight) were placed in a batch mixer at ambient temperature and sprayed over a period of 45 minutes with 20 kg of an aqueous glyoxal solution (40% strength by weight) and 35 litres of an aqueous solution containing 0.2 kg of $Na_2HPO_4$ and 0.16 kg of $NaH_2PO_4$ and also 745 litres of water while mixing. The mixture was mixed for a further 60 minutes and subsequently dried at 96° C. for 4.5 hours in a flow dryer and then comminuted in an impact mill.

The product obtained could be stirred into water or into alkaline solutions without formation of lumps. Solutions of high solution quality without an increase in the turbidity or an increase in the gel content relative to the starting materials were obtained.

The product displays a delay time of at least 3 minutes in alkaline solution at pH 9.

Example 14

An amount of an MHEC which was moist with water corresponding to about 1 800 kg of dry matter was treated in a batch mixer with an aqueous solution containing glyoxal and $Na_2HPO_4+NaH_2PO_4$ in a molar ratio of 1:1, and subsequently dried and milled. The product contained 1.7% by weight of glyoxal and 0.3% by weight of the salts in a homogeneous distribution. The delayed-dissolution MHEC has a pH of 6.2 in deionized water and a delay time of 20 minutes in deionized water.

To determine the storage stability, 2% strength by weight solutions of the product were made up at regular intervals and the viscosity was measured (D=2.55 $s^{-1}$, Haake Viscotester)

| Time after manufacture | Viscosity [mPas] | Relative decrease |
| --- | --- | --- |
| 0.0 year | 40 000 | |
| 0.5 year | 38 200 | 4.5% |
| 1.0 year | 37 400 | 6.5% |
| 1.5 years | 35 300 | 11.8% |
| 2.0 years | 34 600 | 13.5% |

Example 15

Comparison

For comparison, an amount of an MHEC which was moist with water corresponding to about 500 kg of dry matter was treated in a batch mixer with an aqueous solution containing glyoxal and $NaH_2PO_4$, and subsequently dried and milled. The product contained 2% by weight of glyoxal and 0.5% by weight of the salt in a homogeneous distribution. The delayed-dissolution MHEC has a pH of 4.7 in deionized water and a delay time of 60 minutes in deionized water. The delay time at pH 7 is 17 minutes.

To determine the storage stability, 2% strength by weight solutions of the product were made up at regular intervals and the viscosity was measured (D=2.55 $s^{-1}$, Haake Viscotester)

| Time after manufacture | Viscosity [mPas] | Relative decrease |
| --- | --- | --- |
| 0.0 year | 21 200 | |
| 0.5 year | 19 800 | 6.6% |
| 1.0 year | 17 100 | 19.3% |
| 1.5 years | 15 500 | 26.9% |
| 2.0 years | 15 000 | 29.2% |

The MHEC prepared according to the invention (Example 14) displays a significantly reduced decrease in viscosity with storage time compared with the MHEC prepared according to the prior art (Example 15). Furthermore, a person skilled in the art will know that higher-viscosity cellulose ethers tend to suffer from a greater relative decrease in viscosity compared with low-viscosity cellulose ethers.

Examples 16 to 19

The same moist MHEC as in Example 14 was treated in a continuously operating twin-screw extruder with such an amount of an aqueous solution containing glyoxal and $Na_2HPO_4+NaH_2PO_4$ in a molar ratio of 1:1 that the water content of the resulting gel was 78% by weight. This gel was continuously conveyed into a milling/drying unit (Ultrarotor, from Jäckering) and simultaneously comminuted and dried there. The product contained 1.7% by weight of glyoxal and 0.3% by weight of the salts in a homogeneous distribution. Products of differing fineness were produced by varying the circumferential velocity of the milling tools. The fineness of the products was characterized by the amount passing a 0.063 mm sieve.

| Example | Circumferential velocity | Amount passing the sieve, <0.063 mm | Delay time at pH 7 |
| --- | --- | --- | --- |
| 16 | 93 m/s | 70.3% by weight | 13 min |
| 17 | 70 m/s | 40.3% by weight | 15 min |
| 18 | 46 m/s | 7.5% by weight | 16 min |
| 19 | 35 m/s | 1.6% by weight | 18 min |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing cellulose ethers having delayed dissolution in water, comprising:
    (a) treating a moist cellulose ether with a solution comprising a dialdehyde;
    (b) adding an aqueous salt solution to the moist cellulose ether, such that said cellulose ether has a pH of from 6.0 to 8.0, the aqueous salt addition being performed at least one of, (i) prior to step (a), (ii) concurrently with step (a), and (iii) subsequent to step (a); and
    (c) drying and comminuting the treated cellulose ether of step (b), wherein said aqueous salt of step (b) comprises at least two salts, one salt being a weak acid having a pka of from 5.5. to 8.5, and the other salt being the salt of a weak acid having a pka of from 5.5. to 8.5.

2. The process of claim 1 wherein the cellulose ether is a nonionic cellulose ether selected from the group consisting of methylcellulose, methylhydroxyethylcellulose, methylhydroxypropylcellulose and hydroxy-ethylcellulose.

3. The process of claim 1 wherein the cellulose ether is an ionic cellulose ether selected from the group consisting of carboxymethylcellulose, carboxymethylhydroxyethylcellulose, sulphoethylcellulose and carboxy-methylsulphoethylcellulose.

4. The process of claim 1 wherein the cellulose ether prior to drying and comminuting in step (c) has a water content of from 40 to 80% by weight, based on total weight.

5. The process of claim 1 wherein said dialdehyde is glyoxal, which is added in an amount of from 0.1 to 4% by weight of glyoxal, based on dry cellulose ether weight.

6. The process of claim 1 wherein said aqueous salt solution of step (b) comprises an alkali metal dihydrogen phosphate and a di(alkali metal) hydrogen phosphate.

7. The method of claim 6 wherein said alkali metal dihydrogen phosphate is sodium dihydrogen phosphate, and said di(alkali metal) hydrogen phosphate is selected from the group consisting of disodium hydrogen phosphate and sodium potassium hydrogen phosphate.

8. The method of claim 6 wherein the molar ratio of said alkali metal dihydrogen phosphate to said di(alkali metal) hydrogen phosphate is from 2:1 to 1:2.

9. The method of claim 8 wherein the molar ratio of said alkali metal dihydrogen phosphate to said di(alkali metal) hydrogen phosphate is from 1.2:1 to 1:1.2.

10. The process of claim 1 wherein 0.01 to 2 percent by weight of salt, based on the weight of dry cellulose ether, is added in step (b) by means of said aqueous salt solution.

11. A method of preparing a protective colloid, a thickener and an adhesive from cellulose ether comprising, providing a cellulose ether prepared by the method of claim 1.

12. The method of claim 11 wherein said cellulose ether is carboxymethylcellulose.

* * * * *